April 16, 1940.　　　　　G. NEMETZ　　　　　2,197,704

LUBRICATING DEVICE FOR THE AXLE BEARINGS OF RAILWAY VEHICLES

Filed Dec. 1, 1936　　　　2 Sheets-Sheet 1

G. Nemetz
Inventor

By Glascock Downing & Seebold
Attys.

April 16, 1940.  G. NEMETZ  2,197,704

LUBRICATING DEVICE FOR THE AXLE BEARINGS OF RAILWAY VEHICLES

Filed Dec. 1, 1936  2 Sheets-Sheet 2

G. Nemetz
Inventor

By Glascock Downing & Seebold
Attys.

Patented Apr. 16, 1940

2,197,704

UNITED STATES PATENT OFFICE 2,197,704

LUBRICATING DEVICE FOR THE AXLE BEARINGS OF RAILWAY VEHICLES

Gustav Nemetz, Vienna, Austria, assignor to Alex. Friedmann, Vienna, Austria

Application December 1, 1936, Serial No. 113,714
In Austria March 30, 1936

3 Claims. (Cl. 308—85)

This invention relates to a lubricating device for axle bearings of railway vehicles and has for its object to prevent the lubricating oil contained in an oil sump from escaping through the lateral opening or openings of the box through which the axle passes. Such an escape of oil may occur, especially when the vehicle assumes an inclined position or is subjected to transversal shocks or is shaken vehemently in another direction.

According to the invention, a chamber or a plurality of chambers is provided adjacent to the opening or openings of the axle box through which the axle passes, said chamber being separate from the chamber or room containing the oil sump, and an oil lifting or conveying device, preferably a rotating scooping disc, is provided to remove the oil from said chamber or chambers and to return it into the oil sump. By this means the chamber adjacent to the opening of the box through which the axle passes is permanently drained or at least the oil is prevented to rise beyond a predetermined level, sufficiently low to avoid the danger of an escape of the oil through the lateral opening of the box through which the axle passes.

It is a characteristic feature of the present invention that the said oil lifting device which removes the oil from said separated chamber or chambers is a separate device and distinguished from the usual scooping device provided in the axle-box to convey the oil from the oil sump to the working surfaces of the bearing whereby a uniform and permanent lubrication of these surfaces is obtained, while the first-mentioned lifting device merely serves for continually scooping out the oil which has entered said chamber or chambers as mentioned above.

In inner axle bearings in which a middle portion of the axle is supported there are two lateral openings in the axle box for the passage of the axle. In this case both openings may be provided with the chambers as above described so that both openings are protected against oil escape. Both chambers associated with said openings respectively may be connected, for instance by means of a channel, so as to form communicating vessels, and it is sufficient in this case to provide a single oil scooping and throwing member which lifts the oil from both chambers thus connected.

Some embodiments of the present invention are shown by way of example in the accompanying drawings, in which.

Figure 1:
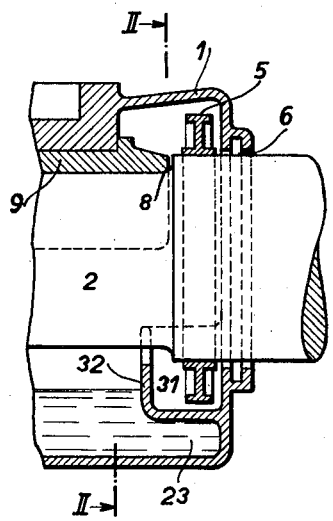
Fig. 1 is a partial sectional view of an axle bearing.
Figure 2:
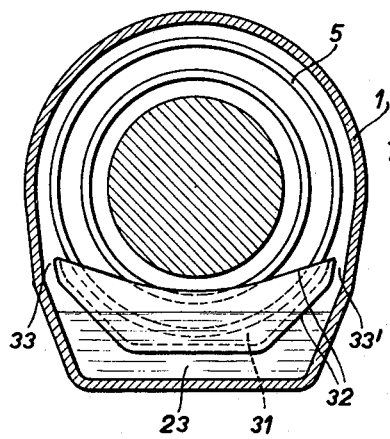
Fig. 2 is a cross section according to line II—II of Fig. 1.

In the embodiment according to Figs. 1 and 2, the axle 2 rotating within the bearing enters the casing 1 of the axle box by the opening 6. Adjacent to this opening 6 a chamber 31 of trough- or cup-shape is arranged, which is separated from the oil sump 23 by means of the partition wall 32. Fixedly secured to the axle 2 is a scooping and oil throwing disc 5 which dips into the oil accumulating within said chamber, and which has such a size that only a small space is left between it and the bottom of said chamber.

During operation the oil, especially that squeezed out at 8 between the working surfaces of the axle and the brass 9, enters the chamber 31 from whence it is lifted by adhesion by the oil thrower disc 5. The oil that has been lifted by said disc is thrown upwards and sideways against the wall of the casing 1 and then flows downwards along this wall through the passages 33, 33' formed between this wall and the partition wall 32 back into the oil sump 23. By these means the oil penetrating into the chamber 31 during operation is removed therefrom and is returned to the oil sump 23 and prevented from escaping through the axle opening 6.

Figure 3:
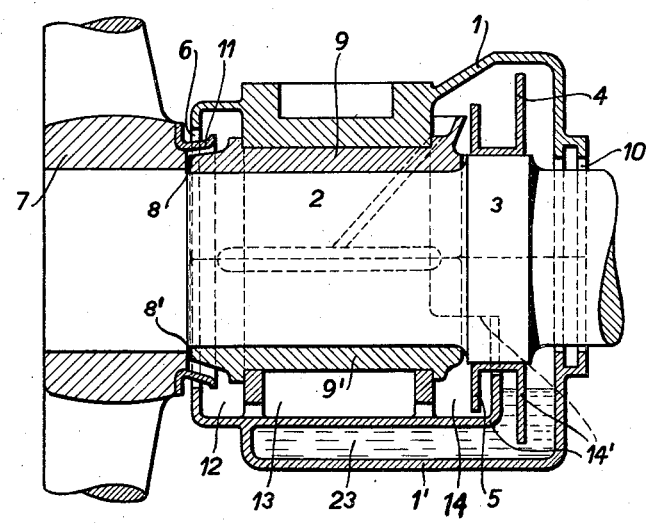
Figs. 3 and 4 are vertical longitudinal sections through two modifications of the invention.

According to Fig. 3 an oil thrower disc 4 is fixedly secured on a collar 3 of the axle 2, this disc dipping into the oil sump 23. The oil lifted by the disc 4 flows downwardly along the wall of the casing 1 towards the upper surface of the brass 9 and from there through oil channels to the working surfaces of the bearing. At a distance from the disc 4, a second disc 5 of smaller diameter is provided which works within a chamber 14 separated from the oil sump by the partition wall 14'. The chamber 14 is connected by the passage 13 with a chamber 12, adjacent to the lateral opening 6 through which the axle 2 passes on the side where it carries the hub 7 of a wheel. The oil escaping at 8 and 8' between the working surfaces of the axle and the brasses 9 and 9' respectively is thrown into the chamber 12 by means of the oil thrower ring 11. The oil entering into the chamber 12 and into the chambers 13 and 14 connected therewith is carried away by adhesion to the disc 5 and is thrown upwards and sideways against the wall of the casing 1. It flows along this wall back into the oil sump 23, as explained in connection with Fig. 2. A relatively small amount of the oil that has been lifted is supplied to the working surfaces of the bearing. The disc 5 always removes a sufficient quantity of oil from the chamber 14 to prevent the oil from rising beyond a predetermined level which may be safely tolerated within the chambers 12, 13 and 14. This level being relatively low, the danger that oil may escape through the axle opening 6 is avoided at all events.

Figure 4:
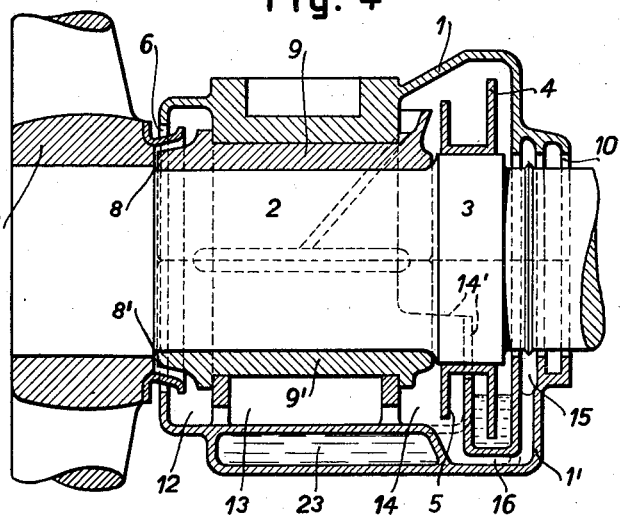

In the modification shown in Fig. 4 an inner axle bearing is shown which carries a middle portion of the axle so that two openings 6 and 10 exist through which the axle 2 has to pass. In such a case, each of these openings may be provided with a separate device according to Figs. 1 and 2. Preferably, however, as shown in the drawing, the chambers 12 and 15 adjacent to the openings 6 and 10 respectively are connected through the passages 13 and 14 and through the channel 16 and a single scooping disc 5 is arranged which continuously removes the oil entering into these chambers. By this means both openings 6 and 10 are protected against escape of oil by a single scooping disc 5. In other respects, the bearing shown in Fig. 4 is constructed and arranged in the same manner as that shown in Fig. 3.

Figure 6:
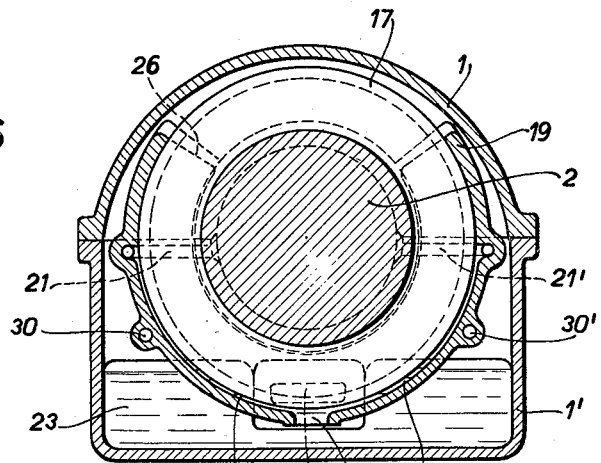
Fig. 5 is a vertical longitudinal section through a further modification of the invention and Figs. 6 and 7 are cross-sections according to lines VI—VI and VII—VII of Fig. 5 respectively.
Figure 5:
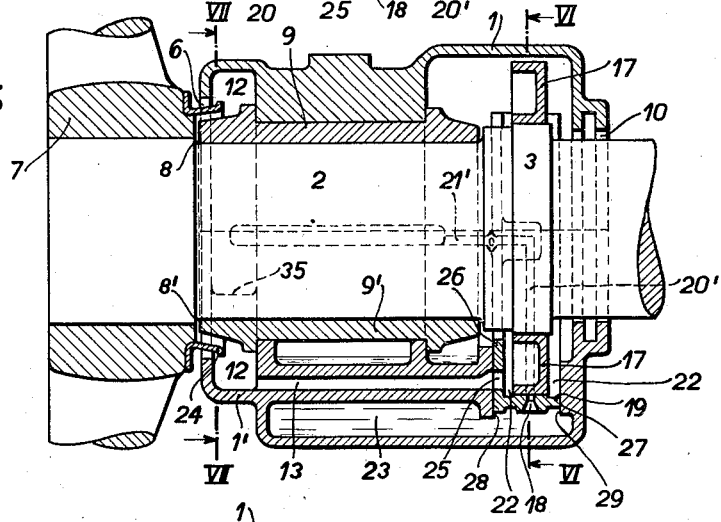
Figure 7:
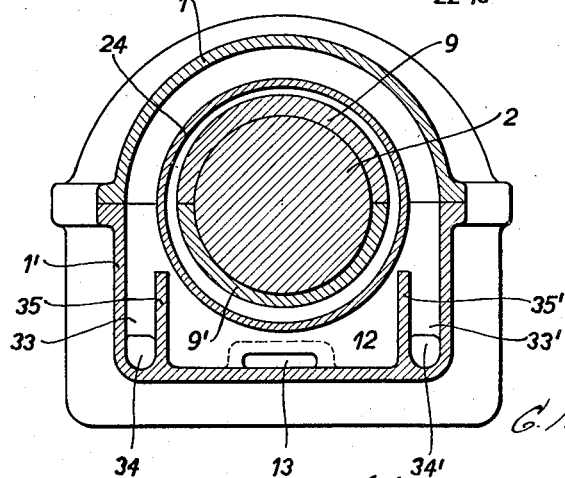

The modification shown in Figs. 5, 6 and 7 refers likewise to an inner axle bearing having two openings 6 and 10 for the passage of the axle. On the collar 3 of the axle 2 a scooping and oil throwing drum 17 is secured which is surrounded by an annular casing 19 within which the drum 17 is allowed to rotate. As shown in Fig. 6, the casing 19 is open at the top of the bearing so as to expose the upper part of the drum 17. The oil that has been carried away by the drum 17 from the oil sump 23 through the opening 18 is conveyed into one of the pressure grooves 20 or 20' provided within the annular casing 19, according to the direction of rotation of the axle 2. Then the oil is supplied through one of the channels 21 or 21' to the working surfaces of the axle brasses 9 and 9'.

The wall 26 of the casing 18, running transversely to the axis of rotation of the bearing, and the opposite end surface 27 of the casing 19 are guided between two vertical parallel walls 28 and 29 of the lower portion 1' of the axle box so that the casing 19 is allowed to be displaced in a radial direction. The clearance existing between the cooperating surfaces of the casing 19 and the box portion 1' is as small as possible so that the hollow space 22 enclosed by the casing is separated from the oil sump 23 and thus serves the same purpose as the chamber 31 of Fig. 1. In order to secure an oil tight seal between the space 22 and the oil sump 23, springs (not illustrated) may be provided within the openings 30 and 30' (Fig. 6), which are bearing against the wall 29 and pressing the casing 19 against the wall 28. As shown in Fig. 5, the right-hand portion of the space 22 is adjacent to the axle opening 10, whereas the left-hand portion of the space 22 communicates through the aperture 25 in the end wall 26 of the casing 19 and through the channel 13 with the chamber 12 located near the axle opening 6. As shown in Fig. 7, the chamber 12 which forms a trough or cup beneath and around the opening 6 is separated from the oil sump 23 by means of upright walls 35 and 35' arranged at a certain distance from the side wall of the lower portion 1' of the axle box.

During operation, oil enters into the chambers 12 and 22. The oil that escapes at 8 and 8' between the axle and the axle brasses 9 and 9' respectively will penetrate into the chamber 12. Most of this oil is thrown by the oil throwing ring 24 secured to the hub 7 of the wheel upwardly and sideways against the walls of the casing 1, 1' from where it flows down through the passages 33, 33' and through the channels 34, 34' (Fig. 7) back to the oil sump 23. Part of the oil is thrown down by the ring 24 into the chamber 12 from where it flows through the channel 13 and the aperture 25 into the chamber 22. Certain quantities of oil, for instance those leaking through between the surface 27 of the casing 19 and the surface 29 of the casing 1' enter also into the right-hand part of the chamber 22. The oil thus entering into the left-hand and right-hand part of the chamber 22 is, however, instantly carried away by the drum 17 and thrown upwards against the wall of the casing 1 from where it returns to the oil sump 23. By this means oil is efficiently prevented filling the chambers adjacent the openings 6 and 10 to an extent which would permit its escape through these openings.

What I claim is:

1. In an axle bearing for railway vehicles a lubricating device, comprising a casing with an oil sump, a rotating oil conveying member, two parallel vertical guiding surfaces in the casing of the axle box, and annular casing surrounding said oil conveying member and slidable in a radial direction between said guiding surfaces of the casing of the axle box, said annular casing being provided with grooves opening downward into the oil sump and in which the rotating oil conveying member can dam up oil under pressure, channels within the axle box, connecting said grooves with the working surfaces of the bearing, the interior of said annular casing being separated from the oil sump in the casing of the axle box, and a chamber adjacent to the lateral opening for the passage of the axle out of the casing, likewise separated from said oil sump of the casing of the axle box and connected with the interior of said annular casing.

2. In an inner axle bearing for railway vehicles a lubricating device, comprising a casing with an oil sump, two parallel vertical guiding surfaces in the said casing, an annular casing slidable in a radial direction between said guiding surfaces, an oil conveying member rotating within said annular casing and subdividing the interior of the latter into two compartments, grooves within said annular casing opening downward into the oil sump and in which the oil carried by the oil conveying member accumulates under pressure, channels within the axle box connecting said grooves with the working surfaces of the bearing, and two chambers separated from the oil sump in the casing, one each adjacent to one of the two lateral openings for the passage of the axle out of the casing of the axle box, each chamber being in communication with one of said compartments of the interior of the said annular casing.

3. In an inner axle bearing for railway vehicles, a casing with an oil sump and having two lateral openings for the passage of the axle, two chambers formed in the casing one disposed adjacent to each of the two lateral openings in the casing provided for the passage of the axle, said chambers being separated from said oil sump by partitions, said two chambers communicating with each other, but not with said oil sump in the casing, an oil lifting device carried by the axle and operating within one of said two chambers to scoop the oil therefrom, the chamber comprising said oil lifting device being provided in its upper part with openings connecting the interior of this chamber with the space of said casing.

GUSTAV NEMETZ.